(12) United States Patent
Shibata et al.

(10) Patent No.: US 8,177,004 B2
(45) Date of Patent: May 15, 2012

(54) CONTROL SYSTEM FOR DRIVE UNIT OF HYBRID VEHICLE

(75) Inventors: Hiroyuki Shibata, Toyota (JP); Tooru Matsubara, Toyota (JP); Takashi Ohta, Toyota (JP); Hideaki Komada, Gotenba (JP); Yukihiko Ideshio, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1058 days.

(21) Appl. No.: 12/091,132

(22) PCT Filed: Oct. 26, 2006

(86) PCT No.: PCT/JP2006/321342
§ 371 (c)(1),
(2), (4) Date: Apr. 22, 2008

(87) PCT Pub. No.: WO2007/049679
PCT Pub. Date: May 3, 2007

(65) Prior Publication Data
US 2009/0236159 A1   Sep. 24, 2009

(30) Foreign Application Priority Data
Oct. 26, 2005   (JP) .................................. 2005-312060

(51) Int. Cl.
*B60K 6/20* (2007.10)

(52) U.S. Cl. .......... 180/65.235; 180/65.275; 180/65.265
(58) Field of Classification Search ................. 475/5, 8; 477/3, 34, 35, 41; 180/65.21, 65.265, 65.275, 180/65.285; 701/22
See application file for complete search history.

(56) References Cited

U.S. PATENT DOCUMENTS

| 5,941,793 A * | 8/1999 | Ito et al. ........................ 477/120 |
| 2004/0259680 A1* | 12/2004 | Ozeki et al. ...................... 477/3 |
| 2005/0170929 A1* | 8/2005 | Ito et al. ............................ 477/3 |
| 2005/0209760 A1 | 9/2005 | Tabata et al. |

FOREIGN PATENT DOCUMENTS

| JP | 2003 127681 | 5/2003 |
| JP | 2003 307270 | 10/2003 |
| JP | 2004 208417 | 7/2004 |
| JP | 2005 16547 | 1/2005 |
| JP | 2005 256883 | 9/2005 |

* cited by examiner

*Primary Examiner* — Katy M Ebner
(74) *Attorney, Agent, or Firm* — Oblon, Spivak, McClelland, Maier & Neustadt, L.L.P.

(57) ABSTRACT

A control system for a drive unit of a hybrid vehicle, which is capable of preventing an uncomfortable feeling, when a vehicle is driven by a power of an electric motor. The control system includes an electric motor, another power unit other than the electric motor, and a transmission, including a speed change inhibiting mechanism for inhibiting a speed change operation of the transmission in case the vehicle is run by a power of the electric motor.

44 Claims, 5 Drawing Sheets

|   | C1 | C2 | B1 | F1 | B2 |
|---|----|----|----|----|----|
| 1st | O |   |   | O | (O) |
| 2nd | O |   | O |   |   |
| 3rd | O | O |   |   |   |
| 4th | O | O |   |   |   |
| R |   | O |   |   | O |
| N |   |   |   |   |   |

CONTROL SYSTEM FOR DRIVE UNIT OF HYBRID VEHICLE

TECHNICAL FIELD

This invention relates to a control system for a drive unit of a hybrid vehicle having an electric motor and another power unit as prime movers, and in which powers from the prime movers are outputted through a transmission.

BACKGROUND ART

In the prior art, for example, there is known a drive unit for a hybrid vehicle, in which power of an internal combustion engine is distributed to an output member and to a motor generator through a planetary gear mechanism, in which the motor generator is used as a reaction member, and in which a revolution frequency of the engine is set to achieve a preferable fuel economy in accordance with a revolution frequency of the motor generator. According to this kind of drive unit, an engine revolution and an output torque can be controlled by the motor generator, therefore, the planetary gear mechanism and the motor generator function substantially as a transmission. Here, since the motor generator functions as a generator and establishes reaction force when the engine is outputting power, an electric power generated by the motor generator is supplied to an electric motor connected with the output member, and the power outputted from the electric motor is applied to the output member.

However, according to the drive unit thus configured, a large capacity electric motor applying power to the output member is required in order to obtain large drive force while operating the engine under the condition where the fuel economy is optimum. For this purpose, a drive unit for a hybrid vehicle disclosed in Japanese Patent Laid-Open No. 2003-127681 is adapted to suppress an increase in size of an electric motor, and to obtain driving force in accordance with a various vehicle speeds. Specifically, according to the invention disclosed in Japanese Patent Laid-Open No. 2003-127681, an internal combustion engine is connected with a carrier of a planetary gear mechanism, a first electric motor/generator is connected with a sun gear of the planetary gear mechanism, and a member of an input side of a transmission is connected with a ring gear. A member of an output side of the transmission is connected with a propeller shaft, and a second electric motor/generator is connected with the propeller shaft.

According to the drive unit disclosed in Japanese Patent Laid-Open No. 2003-127681, gear stage regions of the transmission are set in accordance with a vehicle speed, a gear stage corresponding to the gear stage region to which the running condition belong is set by the transmission, and the engine revolution is controlled by the first electric motor/generator to optimize the fuel economy. For this purpose, the second electric motor/generator is arranged upstream of the transmission, and the gear stage of the transmission is basically set in accordance with the vehicle speed even in case a vehicle is run by the power of the second electric motor/generator. Therefore, if the vehicle speed is changed when the vehicle is run by the motor, an upshifting or a downshifting of the transmission is carried out in response to the change in the vehicle speed. However, in case of such a "motor running", a rotation of the motor is smoother than that of the engine so that noise of the motor resulting from the rotation thereof is also smaller than that of the engine. This means that the fluctuation of the drive force and the noise resulting from a speed change operation of the transmission under the "motor running" are much conspicuous in comparison with those under an "engine running". Especially, if the "motor running" can be selected by an operation of a switch, a driver or a passenger may feel a running condition different from an intended running condition. That is, a driver or a passenger may feel uncomfortable feeling.

DISCLOSURE OF THE INVENTION

The present invention has been conceived noting the technical problems thus far described, and its object is to provide a control system for a drive unit of a hybrid vehicle, which is capable of reducing a frequency of a speed change operation and alleviating shocks when a vehicle is driven by a power of an electric motor.

In order to achieve the above-mentioned object, according to the present invention, there is provided a control system for a drive unit of a hybrid vehicle having an electric motor, an another power unit other than the electric motor, and a transmission, characterized by comprising: a speed change inhibiting means for inhibiting a speed change operation of the transmission in case a vehicle is run by a power of the electric motor.

According to another aspect of the present invention, there is provided a control system for a drive unit of a hybrid vehicle having an electric motor, an another power unit other than the electric motor, and a transmission, characterized by comprising: a speed change restricting means for restricting a speed change operation of the transmission in case a vehicle is run by a power of the electric motor.

The above-mentioned speed change inhibiting means and speed change restricting means include a means for fixing a speed change ratio of the transmission to a speed change ratio of the lowest speed side.

According to the control system for a drive unit of a hybrid vehicle of the invention, the transmission comprises a unidirectional engagement device which is engaged when setting the speed change ratio of the lowest side under driving state; and a bidirectional engagement device which is arranged in parallel with the unidirectional engagement device.

The control system for a drive unit of a hybrid vehicle of the invention further comprises a plurality of oil pumps, and a pump driving means for driving the oil pumps in case of driving the vehicle by the electric motor.

According to the invention, the plurality of oil pumps include a mechanical oil pump driven by the another power unit and an electrical oil pump, and the pump driving means includes a means for driving the another power unit, the mechanical oil pump, and the electrical oil pump by driving the electric motor.

In addition to above, according to the invention, the electric motor includes a motor generator which is rotated by a power inputted through the transmission to generate electric power. Here, the control system for a drive unit of a hybrid vehicle of the invention further comprises: an electric storage device connected with the motor generator; a detecting means for detecting a state of charge of the electric storage device; and an upshift commanding means for carrying out an upshifting of the transmission in case the detecting means detects that the state of charge of the electric storage device declines.

Moreover, according to the invention, the control system for a drive unit of a hybrid vehicle further comprises a speed change ratio maintaining means for maintaining a current speed change ratio of the transmission when a running mode of the vehicle is switched from a normal running in which the power is outputted from the another power unit, to a motor running in which the vehicle is run by the power of the electric motor; and a speed change ratio fixing means for shifting the speed change ratio of the transmission to the lowest speed side and fixing thereto, in case an output changing demand is outputted after the speed change ratio of the transmission is maintained.

In addition to above, the control system for a drive unit of a hybrid vehicle of the invention is characterized by further comprising: a differential gear mechanism having an input rotary element, an output rotary element and a reaction rotary element; and characterized in that the another power unit is connected with the input rotary element, an input member of the transmission and the electric motor are connected with the output rotary element, and the motor generator having a generating function is connected with the reaction rotary element.

The differential gear mechanism may be constructed of a planetary gear mechanism such as a single pinion type planetary gear mechanism and a double pinion type planetary gear mechanism, and the differential gear mechanism may be arranged in tandem with the transmission. Therefore, a total speed change ratio of the drive unit can be set by both of the differential gear mechanism and the transmission.

As explained above, the differential gear mechanism may be constructed of a planetary gear mechanism. In this case, a carrier can be used as the input rotary element by connecting the carrier with the another power unit, a sun gear can be used as the reaction rotary element by connecting the sun gear with the electric motor having a generating function, and a ring gear can be used as the output rotary element by connecting the ring gear with the transmission.

The transmission may be constructed of two sets of planetary gear mechanisms such as a single pinion type planetary gear mechanism or the like. In this case, the sun gears are connected with each other, and the carrier of one of the planetary gear mechanisms is connected with the ring gear of the other planetary gear mechanism. Those sun gears, carrier, and ring gear may be connected with the output element. In addition, a first clutch mechanism may be provided between the ring gear of one of the planetary gear mechanisms and the output rotary element of the differential gear mechanism, and a second clutch mechanism may be provided between the mutually connected sun gears and the output rotary element. Further, a first brake mechanism for fixing the sun gears selectively, and a second brake mechanism for fixing the carrier of the other planetary gear mechanism may be provided. The second brake mechanism may be constructed by arranging a unidirectional engagement device and a bidirectional engagement device in parallel with each other.

As explained above, according to the invention, a speed change operation of the transmission will not be carried out in case the vehicle is being run by the power of the electric motor. Therefore, an abrupt change in the drive force or in the revolution frequency of the electric motor, as well as shift shocks can be prevented or minimized.

Also, according to the invention, a speed change operation of the transmission is restricted in case the vehicle is being run by the power of the electric motor. Therefore, an abrupt change in the drive force or in the revolution frequency of the electric motor, as well as shift shocks can be prevented or minimized.

In addition to the above advantages, according to the invention, relatively large driver force can be ensured.

Also, according to the invention, the speed change ratio can be maintained to the lowest speed side by engaging the bidirectional engagement device arranged in parallel with the unidirectional engagement device, even when the vehicle is running but not driven by the prime mover. For this reason, a power source braking force can be ensured, and a regeneration amount of energy can be increased.

In case of driving the vehicle by the power of the electric motor, a heating value of the electric motor is increased. However, according to the invention, a plurality of oil pumps is driven in this case so that sufficient amount of lubricating oil can be ensured. Therefore, the electric motor can be cooled sufficiently by the sufficient amount of the lubricating oil.

Moreover, according to the invention, said another power unit and the mechanical oil pump connected thereto are not driven at the normal motor running time. Therefore, a power loss can be reduced, and the oil amount can be increased by driving the mechanical oil pump in case the temperature of the transmission is too high. For this reason, the transmission and the electric motor can be cooled and lubricated sufficiently.

Further, according to the invention, an upshifting of the transmission is carried out in case the state of charge of the electric storage device, which stores the power of the motor generator and feeds the power to the motor generator, is degraded. Therefore, although the revolution frequencies of the motor generator and the another power unit are lowered relatively when decelerating to establish power source braking, the power source braking force can be ensured by raising regenerative torque of the motor generator, and drop in the charging amount can be prevented by raising the generating amount of the motor generator to increase the charging amount of the electric storage device.

Furthermore, according to the invention, in case of shifting the speed change ratio to the lowest speed side to drive the vehicle by the power of the electric motor, the speed change ratio of just before the shifting is maintained first of all, and then the speed change ratio is shifted to lowest speed side when the output changing demand is outputted. Thus, a speed change operation is carried out while changing the output. That is, the change in the drive force resulting from a speed change operation is camouflaged with the change in the drive force resulting from the change of the output. In other words, the change in the drive force resulting from a speed change operation occurs when the driver is feeling the change in the drive force. For this reason, uncomfortable feeling is prevented, and in addition, a busy shift is avoided.

Additionally, according to the invention, the above explained advantages can also be achieved also in a hybrid drive unit, in which a power of said another power unit such as an internal combustion engine is distributed to the motor generator and to the transmission through the differential gear mechanism, and in which the power is transmitted to the transmission by driving the electric motor by the power generated by the motor generator.

BEST MODE FOR CARRYING OUT THE INVENTION

Figure 5:
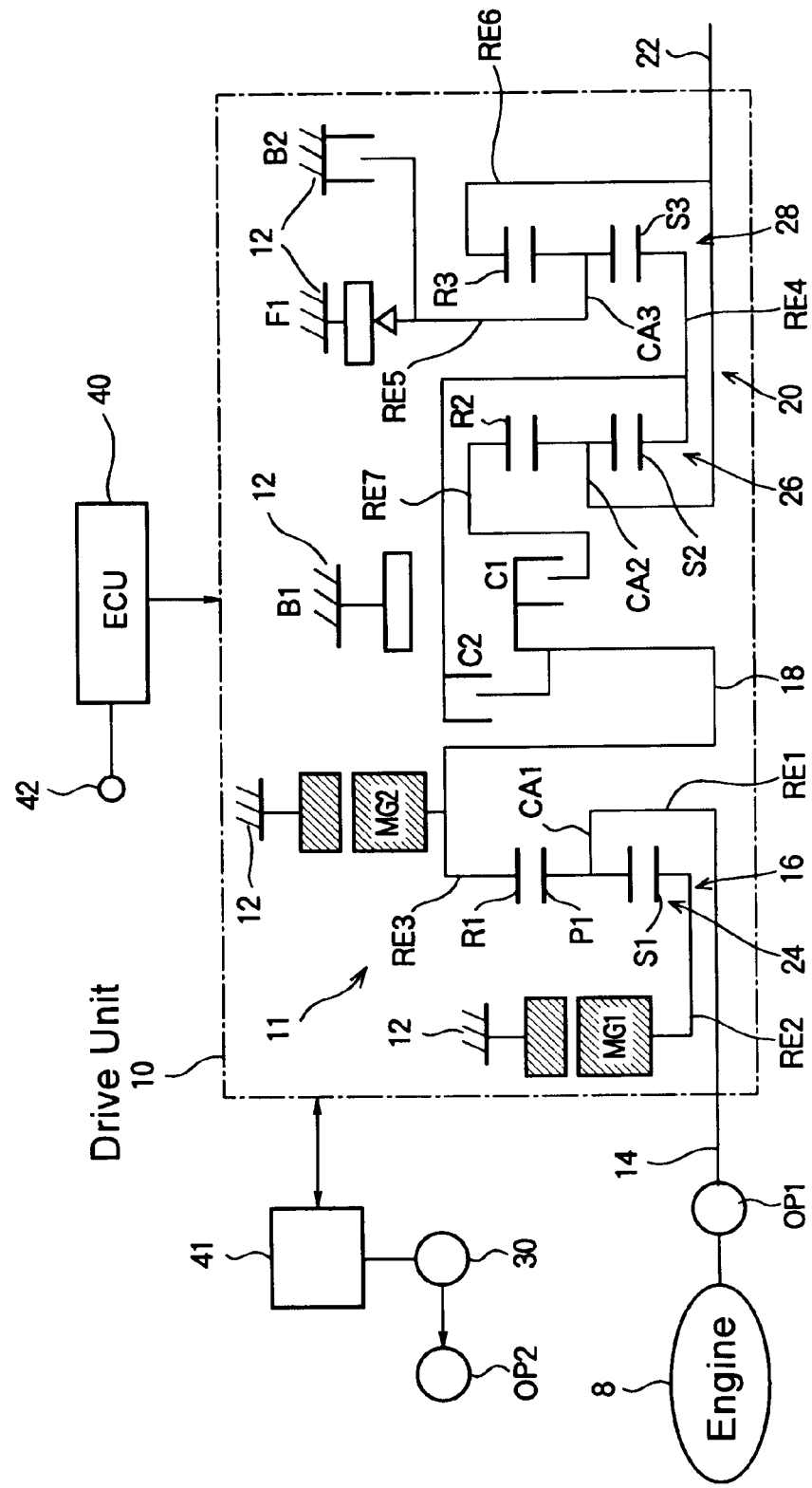
FIG. 5 is a skeleton diagram showing one example of a drive unit for a hybrid vehicle to which the invention is applied.

Next, this invention will be described in connection with its specific examples. A drive unit of a hybrid vehicle to which the invention is applied will be explained first of all. As illustrated in FIG. 5, the drive unit of a hybrid vehicle (as will be called the "drive unit" hereinafter) 10 comprises, an input shaft 14 as an input rotary member arranged coaxially in a non-rotatable transmission case 12 (as will be called as a case 12 hereinafter) mounted on a vehicle, a continuously variable transmission unit 11 connected to the input shaft 14 directly or indirectly through a not shown pulsation absorbing damper (i.e., a vibration dampening device), a geared transmission unit 20 functioning as a geared transmission connected in tandem through a transmission member (i.e., a transmission shaft) 18 on a power transmission route between the continuously variable transmission unit 11 and a (not shown) driving wheel, and an output shaft 22 as an output rotary member connected to the geared transmission unit 20. The above-listed elements are arranged in tandem in the drive unit 10. This drive unit 10 is suitable for front-engine rear-drive vehicles in which elements are arranged in tandem, and the transmission 10 is arranged between an engine as a prime mover for running and a pair of driving wheels. The prime mover is an engine 8 exemplified by a gasoline engine and a diesel engine or the like, and the engine 8 is connected directly with the input shaft 14 or indirectly through a not shown pulsation absorbing damper. This engine 8 corresponds to an another drive unit of the invention. Here, since the arrangement of the drive unit 10 is symmetrical with respect to its axial line, a lower part thereof is omitted in the skeleton diagram of FIG. 5.

The continuously variable transmission unit 11 is a mechanism for mechanically distributing an output of the engine 8 inputted to the input shaft 14. The continuously variable transmission unit 11 comprises a power distribution mechanism 16 functioning as a differential mechanism for distributing the output of the engine 8 to the first electric motor MG1 and to the transmission member 18, and a second electric motor MG2 arranged to rotate integrally with the transmission member 18. According to this embodiment, both electric motors MG1 and MG2 are motor generators having a function to generate electric power. More specifically, the first electric motor MG1 intrinsically has a function as a generator for generating a reaction force, and the second electric motor MG2 intrinsically has a function as a motor for outputting a driving force for running the vehicle. The second electric motor MG2 corresponds to an electric motor of the invention.

The power distributing mechanism 16 comprises a single pinion type first planetary gear mechanism 24 the gear ratio thereof is e.g., approximately "0.418" and it is represented by "ρ1". The first planetary gear mechanism 24 comprises following rotary elements, such as a first sun gear S1, a first planetary gear P1, a first carrier CA1 holding the first planetary gear P1 in a rotatable and revolvable manner, and a first ring gear R1 meshing with the first sun gear S1 through the first planetary gear P1. The aforementioned gear ratio ρ1 is expressed as ZS1/ZR1. Here, ZS1 represents a teeth number of the first sun gear S1, and ZR1 represents a teeth number of the first ring gear R1.

In the power distribution mechanism 16, the first carrier CA1 is connected to the input shaft 14, i.e., to the engine 8, the first sun gear S1 is connected to the first electric motor MG1, and the first ring gear R1 is connected to the transmission member 18. A differential action of the power distribution mechanism 16 is achieved by allowing to rotate three elements of the first planetary gear mechanism 24, i.e., to rotate the first sun gear S1, the first carrier CA1 and the first ring gear R1 relatively among each other. As a result, the output of the engine 8 is distributed to the first electric motor MG1 and to the transmission member 18, and a part of the distributed power of the engine 8 is converted into an electric power by the first electric motor MG1. The electric power is stored or used to drive the second electric motor MG2. In consequence, the continuously variable transmission unit 11 (or the power distribution mechanism 16) functions as an electrical differential mechanism. That is, the continuously variable transmission unit 11 achieves a "continuously variable transmission state (i.e., an electrical CVT state)", so that the revolution frequency of the engine 8 is varied continuously without varying the revolution frequency of the transmission member 18. In short, when the power distribution mechanism 16 is performing the differential action, the continuously variable transmission unit 11 is also performing the differential action. Specifically, the continuously variable transmission unit 11 functions as an electrical continuously variable transmission, in which its speed change ratio Y0 (i.e., revolution frequency of the input shaft 14 or revolution frequency of the transmission member 18) is varied continuously from a minimum value Y0min to a maximum value Y0max.

The geared transmission unit 20 comprises: a single pinion type second planetary gear mechanism 26 the gear ratio thereof is e.g., approximately "0.532", and it is represented by "ρ2"; and a single pinion type third planetary gear mechanism 28 the gear ratio thereof is e.g., approximately "0.418", and it is represented by "ρ3". A second sun gear S2 of the second planetary gear mechanism 26 and a third sun gear S3 of the third planetary gear mechanism 28 are connected integrally with each other, and a second clutch C2 is arranged between those sun gears S2 and S3 and the transmission member 18. Also, a first brake B1 for fixing the sun gears S2 and S3 integrally is arranged between the sun gears S2 and S3 and the case 12. A second carrier CA2 of the second planetary gear mechanism 26 and a third ring gear R3 of the third planetary gear mechanism 28 are connected integrally with each other. Those carrier CA2 and ring gear R3 are connected to the output shaft 22. On the other hand, there is provided a first clutch C1 connecting a second ring gear R2 selectively to the transmission member 18. Further, a second brake B2 and a one-way clutch F1 is provided as means for connecting a third carrier CA3 of the third planetary gear mechanism 28 selectively to the case 12 and fixing thereto. Here, the one-way clutch F1 is engaged to fix the third carrier CA3 in case a torque acts on the third carrier CA3 in the direction to rotate it backwardly, i.e., in the rotational direction opposite to the rotational direction of the engine 8.

The aforementioned first clutch C1, second clutch C2, first brake B1, and second brake B2 are hydraulic frictional engagement devices generally used in the conventional automatic transmissions for a vehicle. Those hydraulic frictional engagement devices are composed mainly of a wet multiple disc clutch in which a plurality of frictional discs facing with each other are pressed by a hydraulic actuator, a band brake in which one of the end of one or two band(s) applied to an outer circumferential face of a rotating drum is (are) wound up by a hydraulic actuator, and so on. The role of the hydraulic frictional engagement device is to connect the members of both sides thereof selectively.

In order to generate oil pressure for controlling and lubricating the hydraulic frictional engagement devices, and for cooling the electric motors MG1 and MG2, there are provided two of oil pumps PO1 and OP2. One of the oil pumps OP1 is a mechanical oil pump and connected to the engine 8 to be driven by the engine 8. The other oil pump is an electrical oil pump driven by the motor 30.

Figures 6, 7:
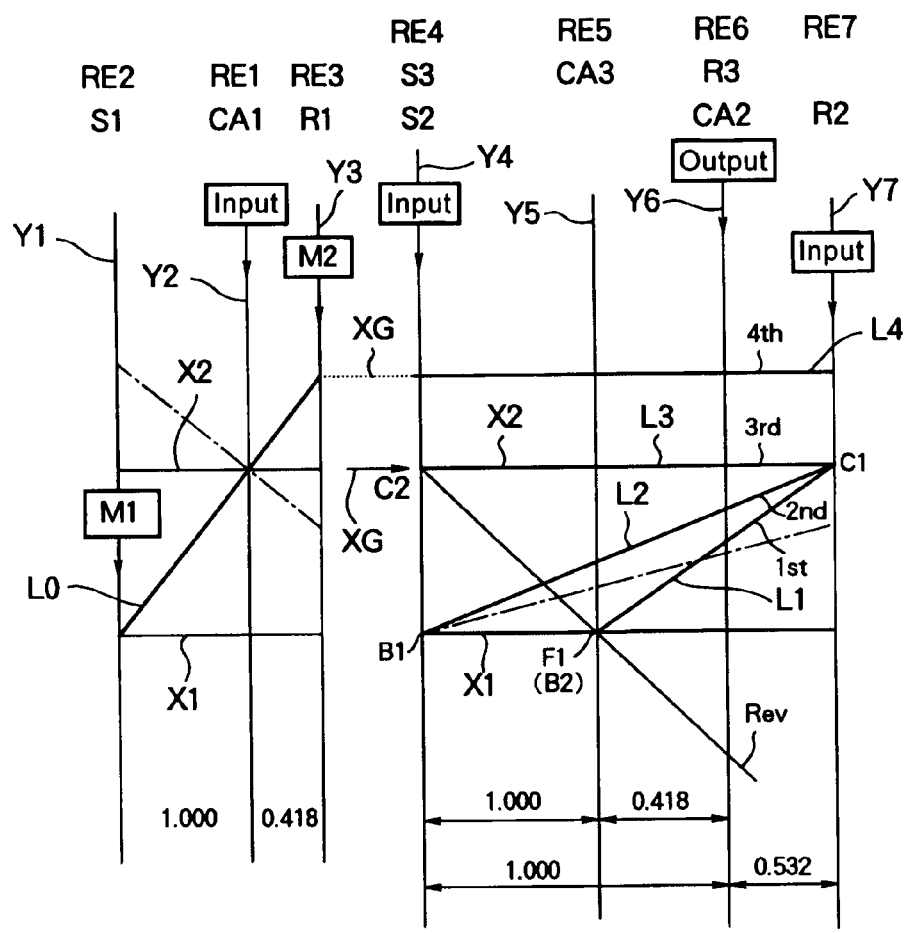
FIG. 6 is a table showing a relation between gear stages set by a geared transmission and engagement states of hydraulic frictional engagement devices.
FIG. 7 is a nomographic diagram explaining operating states of individual transmissions shown in FIG. 5.

According to the drive unit 10 thus far explained, as indicated in the table of FIG. 6, any of a first gear stage (represented as 1st in the table) to a fourth gear stage (represented as 4th in the table), a reverse gear stage (represented as R in the table), and a neutral (represented as N in the table) are achieved by selectively activating the aforementioned elements, specifically, by selectively engaging the first clutch C1, the second clutch C2, the first brake B1, the second brake B2 and the one-way clutch F1. As a result, a speed change ratio Y (i.e., input shaft revolution NIN/output shaft revolution NOUT), which changes substantially in equal ratio at every gear stage is obtained. Here, In FIG. 6, "◯" represents an "engagement" of the element, a blank means that the element is released, and "(◯)" represents that the element is engaged when applying a power source braking.

The continuously variable transmission 11 functions as a continuously variable transmission, and the geared transmission unit 20 arranged in tandem therewith functions as a geared transmission. As a result, the input revolution to the geared transmission unit 20, more specifically, the revolution frequency of the transmission member 18 to be inputted individually to the first to fourth gear stages of the geared transmission unit 20 is varied continuously, and the individual gear stages thereby obtain a continuous range of the speed change ratio. For this reason, the speed change ratio can be varied steplessly and continuously even between the gear stages. Consequently, a speed change ratio YT achieved by the continuously variable transmission unit 11 and the geared transmission unit 20, more specifically, a total speed change ratio YT as an entire speed change ratio of the drive unit 10, which is governed by both of the speed change ratio Y0 of the continuously variable transmission unit 11 and the speed change ratio Y of the geared transmission unit 20, can be varied steplessly.

FIG. 7 is a nomographic diagram linearly indicating a relation of revolution frequencies of the rotary elements to be connected depending on the gear stage, in the drive unit 10 comprising the continuously variable transmission unit 11 functioning as a differential unit or a first transmission unit, and the geared transmission unit 20 functioning as a (an automatic) transmission unit or a second transmission unit. The nomographic diagram of FIG. 7 is a two-dimensional coordinate composed of abscissa axes indicating relations of the gear ratios "ρ" of individual planetary gear mechanisms 24, 26 and 28, and longitudinal axes indicating relative revolution frequencies. In the diagram, the bottom abscissa axis X1 represent "zero" revolution, and the middle abscissa axis X2 represents the revolution frequency of "1.0", i.e., a revolution frequency Ne of the engine 8 connected with the input shaft 14, and an abscissa axis XG represents a revolution frequency of the transmission member 18.

Meanwhile, three longitudinal axes Y1, Y2 and Y3 individually indicates relative revolution frequencies of three elements of the power distribution mechanism 16 of the continuously variable transmission unit 11. Specifically, Y1 indicates relative revolution frequency of the first sun gear S1 corresponding to a second rotary element (or a second element) RE2, Y2 indicates relative revolution frequency of the first carrier CA1 corresponding to a first rotary element (or a first element) RE1, and Y3 indicates relative revolution frequency of the first ring gear R1 corresponding to a third rotary element (or a third element) RE3. Clearances between those longitudinal axes Y1 to Y3 are determined individually in accordance with a gear ratio ρ1 of the first planetary gear mechanism 24. Four longitudinal axes Y4 to Y7 individually represent the rotary elements of the geared transmission unit 20. Specifically, Y4 represents the mutually connected second sun gear S2 and third sun gear S3 corresponding to a fourth rotary element (or a fourth element) RE4, Y5 represents the third carrier CA3 corresponding to a fifth rotary element (or a fifth element) RE5, Y6 represents the mutually connected second carrier CA2 and third ring gear R3 corresponding to a sixth rotary element (or a sixth element) RE6, and Y7 represents the second ring gear R2 corresponding to a seventh rotary element (or a seventh element) RE7. Clearances between those longitudinal axes Y4 to Y7 are determined individually in accordance with a gear ratios ρ2 and ρ3 of the second and third planetary gear mechanisms 26 and 28. Provided that the clearance between the longitudinal axes representing the sun gear and the carrier is set to "1", the clearance between the longitudinal axes representing the carrier and the ring gear indicates the gear ratio ρ of the planetary gear mechanism. Specifically, in the continuously variable transmission unit 11, the clearance between the longitudinal axes Y1 and Y2 is set to "1", and the clearance between Y2 and Y3 is set to the gear ratio ρ1. In the second and third planetary gear mechanisms 26 and 28 of the geared transmission unit 20, also, each clearance between the sun gear and the carrier is set to "1" and each clearance between the carrier and the ring gear is set to "ρ".

As can be seen from the nomographic diagram in FIG. 7, in the power distribution mechanism 16 (or the continuously variable transmission unit 11) of the drive unit 10 of this embodiment, the first rotary element RE1 (or the first carrier CA1) of the first planetary gear mechanism 24 is connected to the input shaft 14, i.e., to the engine 8, the second rotary element RE2 is connected to the first electric motor MG1, and the third rotary element RE3 (or the first ring gear R1) is connected to the transmission member 18 and to the second electric motor MG2. Therefore, a power is transmitted (i.e., inputted) from the input shaft 14 to the geared transmission unit 20 via the transmission member 18. The relation between the revolution frequencies of the first sun gear S1 and the first ring gear R1 is indicated by a slant line L0 passing through an intersection of Y2 with X2.

Since the first planetary gear mechanism 24 performs a differential action, the revolution frequency of the first ring gear R1 indicated at the intersection of the line L0 with the longitudinal axis Y3 is fluctuated, if the revolution frequency of the first sun gear S1 indicated at the intersection of the line L0 with the longitudinal axis Y1 is fluctuated by controlling the reaction force resulting from a generation of the first electric motor MG1.

On the other hand, in the geared transmission unit 20, the fourth rotary element RE4 is connected selectively to the transmission member 18 through the second clutch C2 and selectively to the case 12 through the first brake B1, the fifth rotary element RE5 is connected selectively to the case 12 through the second brake B2, the sixth rotary element RE6 is connected selectively to the case 12 through the third brake B3, and the seventh rotary element RE7 is connected to the output shaft 22.

As shown in FIG. 6, in the geared transmission unit 20, a revolution frequency of the output shaft 22 at the first gear stage is indicated at the intersection of the slant line L1 with the longitudinal axis Y6 indicating the revolution frequency of the sixth rotary element RE6 connected to the output shaft 22. Here, the line L1 is determined as a result of an engagement of the first clutch C1 and the one-way clutch F1 or the second brake B2, and it extends from the intersection of the longitudinal axis Y5 indicating the revolution frequency of the fifth rotary element RE5 with the abscissa axis X1, to the intersection of the longitudinal axis Y7 indicating the revolution frequency of the seventh rotary element RE7 with the abscissa axis X2. As in the case of the first gear stage: a revolution frequency of the output shaft 22 at the second gear stage is indicated at the intersection of the longitudinal axis Y6 with a slant line L2 determined as a result of engaging the first clutch C1 and the first brake B1; and a revolution frequency of the output shaft 22 at the third gear stage is indicated at the intersection of the longitudinal axis Y6 with a horizontal line L3 determined as a result of engaging the first clutch C1 and the second clutch C2. If the first sun gear S1 is fixed by the first electric motor MG1, the power from the continuously variable transmission unit 11 is inputted at the revolution frequency higher than the revolution frequency NE of the engine 8. Therefore, a revolution frequency of the output shaft 22 at the fourth gear stage is indicated at the intersection of the longitudinal axis Y6 with a horizontal line L4 determined as a result of engaging the first clutch C1 and the second clutch C2.

As explained above, the drive unit 10 of the invention comprises: the continuously variable transmission unit 11, in which a speed change ratio thereof is varied in accordance with the revolution frequency of the first electric motor MG1; and the geared transmission unit 20, in which a gear ratio thereof is changed according to the change in a power transmitting point, more specifically, according to the change in a power transmitting route which is changed depending on the engagement and releasing status of the clutches C1 and C2, and brakes B1 and B2. Therefore, the total speed change ratio is controlled to vary continuously as much as possible. For this purpose, in case of carrying out a shifting operation of the geared transmission unit 20, the continuously variable transmission unit 11 (i.e., a revolution frequency of the first electric motor MG1) is controlled to vary the speed change ratio thereof in the direction opposite to the change in the gear ratio of the geared transmission unit 20.

In this case, the shifting operation of the geared transmission unit 20 is carried out by feeding the oil pressure to any of the clutches C1 and C2 or any of the brakes B1 and B2, or draining the oil pressure therefrom. On the other hand, the speed change operation of the continuously variable transmission unit 11 is carried out by electrically controlling the revolution frequency of the first electric motor MG1. Therefore, a speed changing rate of the continuously variable transmission unit 11 is faster than a shifting rate of the geared transmission unit 20. For this reason, the speed change operation of the continuously variable transmission unit 11 is carried out in accordance with a progression of the shifting operation of the geared transmission unit 20.

Specifically, the power of the engine 8 is inputted to the carrier CA1 of the first planetary gear mechanism 24 in the continuously variable transmission unit 11, and the power is distributed to the sun gear S1 and to the ring gear R1. In this situation, if the first electric motor MG1 is operated as a generator, the first electric motor MG1 establishes a reaction force against the sun gear S1. As a result, the ring gear R1 is rotated according to the revolution frequency of the sun gear S1. That is, provided that the revolution frequency of the ring gear R1 is constant, the revolution frequency of the engine 8 can be controlled by the first electric motor MG1. Therefore, the substantial speed change ratio of the continuously variable transmission unit 11 is varied continuously by changing the revolution frequency of the engine 8 continuously.

Under the driving state, the electric power is thus generated by the first electric motor MG1, and the generated electric power is supplied to the second electric motor MG2. Consequently, the second electric motor MG2 is driven as a motor and the torque is transmitted to the transmission member 18. In order to carry out this kind of control, the first and the second electric motors MG1 and MG2 are connected to the electric storage device 41 thorough a (not shown) controller. Here, it is possible to feed the electric power to a motor 30 driving the oil pump OP2 from the electric storage device 41. Alternatively, it is also possible to supply the electric power selectively to the motor 30 by providing a not shown another electric storage device 41.

A speed change operation of the continuously variable transmission unit 11 is carried out by obtaining a target revolution to achieve the total speed change ratio determined on the basis of an output demand detected from a depression of a (not shown) accelerator pedal, and by controlling the first electric motor MG1 to achieve the target revolution in first order lag. Alternatively, a speed change operation of the continuously variable transmission unit 11 is carried out by setting a transitional target revolution for achieving the target revolution, and by controlling the first electric motor MG1 to vary the transitional target revolution to approximate to the target revolution sequentially. This kind of control of the speed change ratio is executed by a command signal from an electronic control unit (ECU) 40. For this purpose, a various kinds of data, e.g., a vehicle speed, an opening degree of an accelerator (i.e., an output demand), a shift position, a revolution frequency of the first electric motor MG1 are inputted to the electronic control unit 40. Also, data such as a speed change diagram in which a speed change ratio is set in accordance with the running condition is stored in the electronic control unit 40 in advance.

The above-mentioned drive unit 10 is capable of carrying out a so-called "Motor Running (i.e., EV Running)". EV running is a running mode in which the vehicle is run by the power of any of the electric motors MG1 and MG2 while halting the engine 8. For this purpose, there is provided an EV switch 42 for selecting the EV running, and a signal for the EV running is inputted from the electronic control unit 40. A drive force under the EV running and a duration time of the EV running are smaller and shorter in comparison with those under the normal running mode in which the vehicle is run by driving the engine 8. Also, a thermal load on the electric motors MG1 and MG2 are larger than that under the normal running. Therefore, according to the control system of the invention, the following control is carried out.

Figure 1:
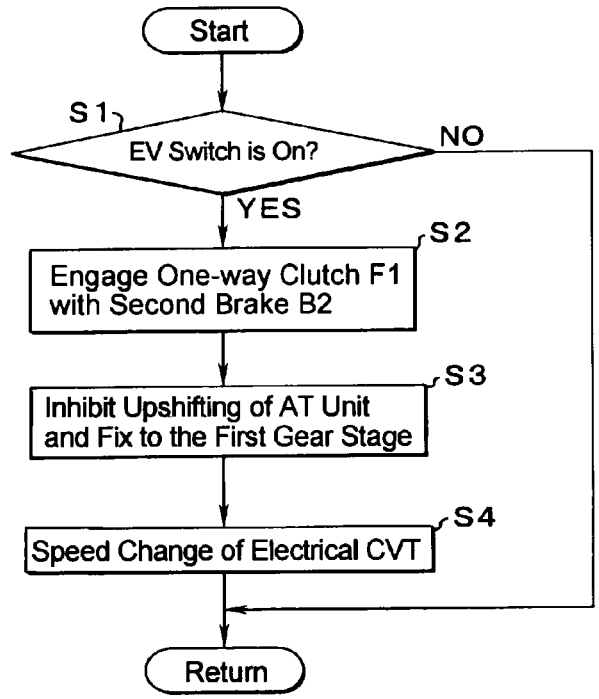
FIG. 1 is a flowchart explaining one example of the control carried out by the control system of the invention.

FIG. 1 is a flowchart explaining one example the control. First of all, it is judged whether or not the EV running mode is selected, that is, it is judged whether or not the EV switch 42 is ON (at Step S1). In case the answer of Step S1 is NO, the routine is returned without carrying out any specific control. To the contrary, in case the answer of Step S1 is YES, the first gear stage of the geared transmission 20 is set to apply an engine brake (i.e., a power source braking) (at Step S2). Specifically, as shown in FIG. 7, the second brake B2 is engaged with the one-way clutch F1 arranged in parallel therewith. Accordingly, the second brake B2 corresponds to the bidirectional engagement device of the invention.

Then, the gear stage of the geared transmission (or AT unit) 20 is fixed to the first gear stage (at Step S3). In case the vehicle speed is increased under the normal running mode, the total speed change ratio, i.e., the entire speed change ratio of the drive unit 10 is shifted upwardly to the high speed side, and an upshifting of the geared transmission 20 is carried out in response to the upshifting of the total speed change ratio.

However, in case the EV running mode is selected, the gear stage of the geared transmission 20 is fixed to the first gear stage at Step S3, by inhibiting or restricting an upshifting of the geared transmission 20.

The total speed change ratio is shifted upwardly to the high speed side according to a rise in the vehicle speed even under the EV running mode. Therefore, a speed change operation of the continuously variable transmission unit 11 is carried out in accordance with the running condition of the vehicle such as a vehicle speed (at Step S4). Specifically, the engine 8 is halted under the EV running mode, therefore, the ring gear R1 and the transmission member 18 connected therewith is rotated in the forward direction by rotating the first electric motor MG1. In this situation, the vehicle is run by the powers of the first and the second electric motors MG1 and MG2 by operating the second electric motor MG2 to apply the torque to the transmission member 18. Therefore, in case the vehicle speed is increased, the revolution frequencies of the ring gear R1 and the transmission member 18 connected therewith are raised by reducing the revolution frequency of the first electric motor MG1, i.e., by raising the revolution frequency of the first electric motor MG1 in the backward direction. To the contrary, in case the vehicle speed is lowered, the revolution frequencies of the ring gear R1 and the transmission member 18 connected therewith are lowered by raising the revolution frequency of the first electric motor MG1, i.e., by reducing the revolution frequency of the first electric motor MG1 in the backward direction. For example, this control is carried out by preparing a speed change map for the EV running mode in advance, by obtaining a total speed change ratio from the detected running condition and the speed change map, and by controlling the revolution frequency of the first electric motor MG1 and the torque of the second electric motor MG2 to achieve the total speed change ratio.

Therefore, a shifting operation of the geared transmission 20 will not be carried out under the EV running mode by carrying out the control shown in FIG. 1. For this reason, it is possible to prevent shocks resulting from the stepwise change in the speed change ratio. As explained, the first gear stage of the geared transmission 20 is the lowest side gear stage where the gear ratio thereof is largest. Therefore, the torque inputted to the geared transmission 20 can be amplified to be outputted to the output shaft 22. As a result, the drive force for the entire vehicle can be ensured.

Figure 2:
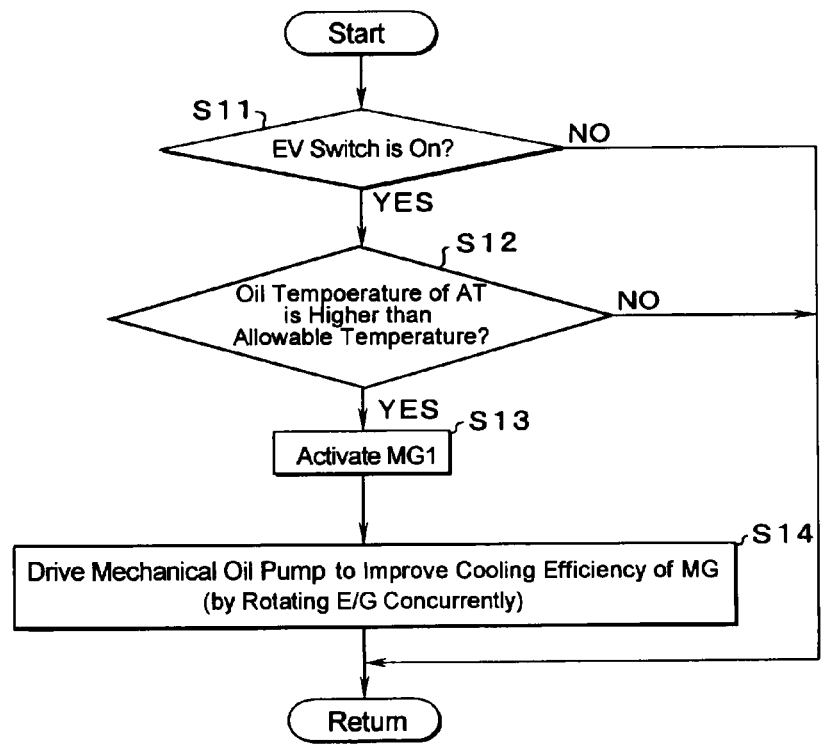
FIG. 2 is a flowchart explaining another example of the control carried out by the control system of the invention.

As explained above, the thermal loads on the electric motors MG1 and MG2 are increased under the EV running mode, in comparison with those under the normal running mode. However, the oil is commonly used for cooling the electric motors MG1 and MG2 and for lubricating the geared transmission 20. That is, the oil temperature tends to be raised under the EV running mode. For this reason, the control system of the invention carries out the control shown in FIG. 2. Specifically, in case the EV running mode is selected, i.e., in case the answer of Step S11 in FIG. 2 is YES, it is judged whether or not the oil temperature of the geared transmission 20 is higher than a predetermined allowable oil temperature (at Step S12). In case the answer of Step S11 is NO, the routine is returned without carrying out any specific control.

The allowable oil temperature is a temperature set in advance to maintain the temperatures of the electric motors MG1 and MG2 lower than an upper limit. In case the detected temperature exceeds the allowable oil temperature so that the answer of Step S12 is YES, the first electric motor MG1 is activated (at Step S13). In case the answer of Step S12 is NO, the routine is returned without carrying out any specific control.

Basically, the first electric motor MG1 is activated to control a speed change operation of the continuously variable transmission unit 11, however, at Step S13, the first electric motor MG1 is activated to increase the oil amount in addition to the aforementioned fundamental role. That is, since the first planetary gear mechanism 24 constituting the continuously variable transmission 11 performs a differential action among the engine 8, the first electric motor MG1 and the transmission member 18, the revolution frequency of the engine 8 can be controlled by the revolution frequency of the first electric motor MG1. Specifically, the revolution frequency of the engine 8 is increased by raising (or lowering in the backward direction) the revolution frequency of the first electric motor MG1 higher than the revolution thereof where the engine 8 is halted when the vehicle is running under the EV running mode. Namely, the engine 8 is rotated concurrently to drive the mechanical oil pump OP1 connected therewith (at Step S14).

Basically, the lubrication oil is fed to the geared transmission unit 20 and circulated therein by driving the mechanical oil pump OP2 by the motor 30. However, even in case the amount of the lubrication oil is relatively insufficient and the oil temperature is thereby raised, the lubrication oil can be further fed to the geared transmission unit 20 by driving the mechanical oil pump OP1, which is basically driven by the engine 8, by the first electric motor MG1. For this reason, sufficient amount of the lubrication oil can be ensured in the geared transmission unit 20. Therefore, the electric motors MG1 and MG2 can be cooled by the ensured lubrication oil so that an overheating of the electric motors MG1 and MG2 can be prevented. As a result, the EV running mode can be continued.

As mentioned above, the vehicle is run by the electric power of the electric storage device 41 under the EV running mode. Therefore, it is preferable to ensure the charging amount by carrying out a regeneration of energy as much as possible in case the EV running mode is selected. For this purpose, according to the invention, the following control can be carried out by detecting a state where the regeneration of energy can be carried out, e.g., by detecting a state where the vehicle is decelerated.

Figure 3:
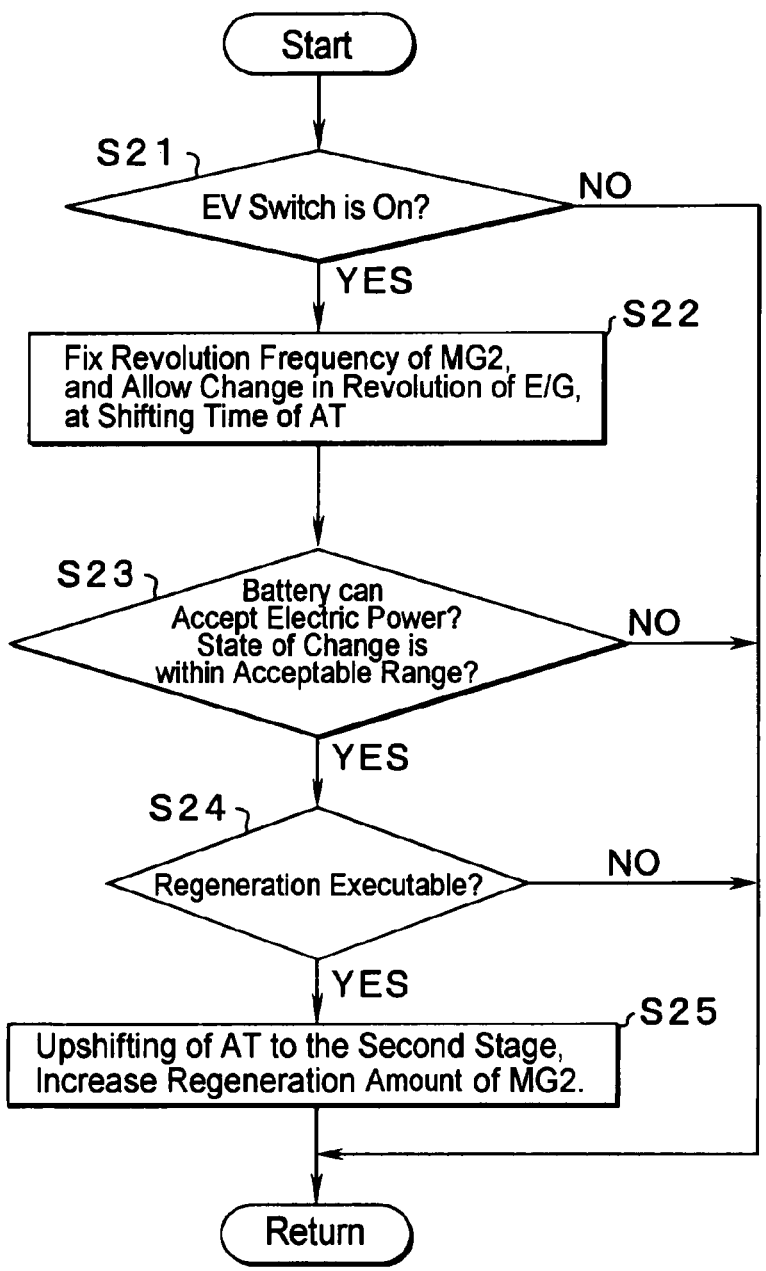
FIG. 3 is a flowchart explaining still another example of the control carried out by the control system of the invention.

FIG. 3 is a flowchart explaining an example of the above-mentioned control. First of all, it is judged whether or not the EV running mode is selected, specifically, whether or not the EV switch is ON (at Step S21). In case the answer of Step S21 is YES, the revolution frequency of the first electric motor MG1 is fixed when the shifting operation of the geared transmission unit 20 is carried out, and the revolution frequency of the engine 8 is allowed to be changed in connection with fixing the revolution frequency of the first electric motor MG1 (at Step S22). Then, it is judged whether or not the electric storage device 41 can accept the electric power, that is, an amount of the electric power stored in the electric storage device 41 is within an allowable range to accept the electric power to be charged (at Step S23).

In case the answer of Step S23 is NO, the routine is returned without carrying out any specific control. To the contrary, in case the answer of Step S23 is YES, a judgment of regeneration is carried out, that is, it is judged whether or not the running condition of the vehicle is a condition where a regeneration of energy can be carried out (at Step S24). This judgment can be made based on the fact that the output demand becomes zero, e.g., based on the fact that a (not shown) accelerator pedal is returned when the vehicle is running at a speed higher than a predetermined speed.

In case the answer of Step S24 is NO, the routine is returned without carrying out any specific control. Consequently, the gear stage of the geared transmission unit 20 is kept to the first gear stage by the aforementioned control shown in FIG. 1. To the contrary, in case the answer of Step S24 is YES, specifically, in case the regeneration of energy can be carried out, the control to fix the gear stage of the geared transmission unit 20 to the first gear stage is cancelled and the geared transmission unit 20 is shifted upwardly (at Step S25). For example, the geared transmission unit 20 is shifted to the second gear stage. When the geared transmission unit 20 is shifted upwardly, the revolution frequency of the transmission member 18 of the input side is lowered. Therefore, the regenerative torque of the second electric motor MG2 is increased in order to maintain the engine braking force and to increase a regeneration amount. At least a part of the electric power thus obtained is fed to the electric storage device 41 and stored therein.

Thus, the regeneration of energy is promoted to obtain the electric energy under the EV running mode where the vehicle is run by the electric power. For this reason, duration of the EV running mode can be prolonged.

If the state of charge (SOC) of the electric storage device 41 is low when the vehicle is running under the EV running mode, the engine 8 is driven to generate an electric power. The generated electric power is used to drive the vehicle and also stored into the electric storage device 41. In this case, the geared transmission unit 20 is fixed to the first gear stage under the EV running mode. However, the control system of the invention is adapted to carry out a control shown in FIG. 4 in order to prevent or minimize the shocks resulting from a downshifting to the first gear stage.

Figure 4:
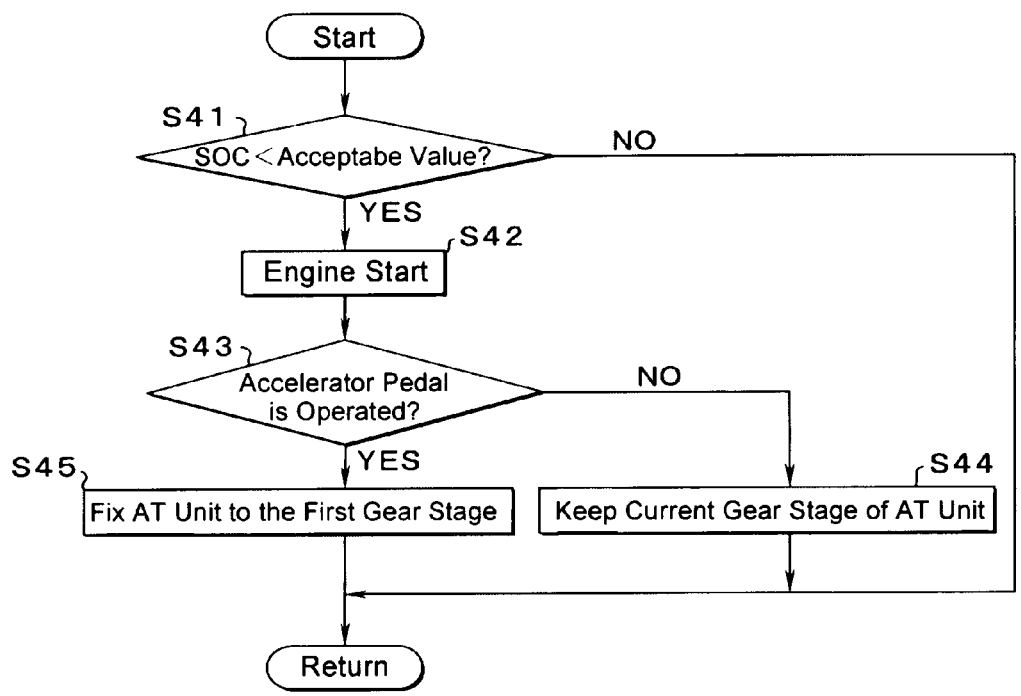
FIG. 4 is a flowchart explaining still another example of the control carried out by the control system of the invention.

FIG. 4 shows an example of the control to carry out a downshifting of the geared transmission unit 20 to carry out the EV running mode. First of all, it is judged whether or not the state of charge (SOC) of the electric storage device 41 is lower than a predetermined acceptable value (at Step S41). In case the answer of Step S41 is NO, the routine is returned without carrying out any specific control. To the contrary, in case the answer of Step S41 is YES, the engine 8 is started (at Step S42). Specifically, a motoring of the engine 8 is carried out by the first electric motor MG1 or a (not shown) starter motor, and a fuel is fed to the engine 8 simultaneously.

Then, it is judged whether or not the output demand is changed (at Step S43). This judgment can be made based on the fact that the not shown accelerator pedal is operated. In case the answer of Step S43 is NO, specifically, in case the output demand is not changed, the gear stage of the geared transmission unit 20 is kept to the current gear stage (at Step S44). Then, the routine is returned. To the contrary, in case the answer of Step S43 is YES, a downshifting of the geared transmission unit 20 is carried out and the gear stage is fixed to the first gear stage (at Step S45).

Thus, according to the control shown in FIG. 4, a shifting operation of the geared transmission unit 20 to the first gear stage will not be executed only by shifting the running mode from the normal running mode to the EV running mode. That is, a shifting operation of the geared transmission unit 20 to the first gear stage is executed when the output demand is changed. This means that the shifting operation is executed at a timing to operate the accelerator or the like, as the case of executing the shifting operation under the normal running mode. For this reason, the driver will not feel an uncomfortable feeling.

Here will be briefly explained a relation between the aforementioned examples and the invention. The functional means of Step S3 shown in FIG. 1 corresponds to the speed change inhibiting means and the speed change restricting means of the invention. The functional means of Steps S13 and S14 shown in FIG. 2 correspond to the pump driving means of the invention. The functional means of Step S25 shown in FIG. 3 corresponds to the upshift commanding means of the invention. The functional means of Step S44 shown in FIG. 4 corresponds to the speed change ratio maintaining means of the invention. The functional means of Step S45 shown in FIG. 4 corresponds to the speed change ratio fixing means of the invention.

Here, the present invention should not be limited to the above-mentioned specific examples. Specifically, according to the invention, the transmission may be both geared transmission and continuously variable transmission. Moreover, in case of inhibiting or restricting a speed change operation, the gear stage may be fixed not only to the lowest gear stage but also to the other gear stage of lower side. Further, the motor running may be set not only manually by operating the switch but also by a signal from another suitable control system.

INDUSTRIAL APPLICABILITY

The present invention can be utilized in a field of manufacturing and repairing automobiles such as cars, and in a field of manufacturing and processing parts for automobiles.

The invention claimed is:

1. A control system for a drive unit of a hybrid vehicle including an electric motor, another power unit other than the electric motor, and a transmission, comprising:
    a speed change inhibiting means for inhibiting a speed change operation of the transmission in case a vehicle is run by a power of the electric motor;
    a speed change ratio maintaining means for maintaining a current speed change ratio of the transmission when a running mode of the vehicle is switched from a normal running in which the power is outputted from the another power unit, to a motor running in which the vehicle is run by the power of the electric motor; and
    a speed change ratio fixing means for setting the speed change ratio of the transmission to the lowest speed side and fixing thereto, in case an output changing demand is outputted after the speed change ratio of the transmission is maintained.

2. The control system for a drive unit of a hybrid vehicle as claimed in claim 1, wherein:
    the speed change inhibiting means includes a means for fixing a speed change ratio of the transmission to a speed change ratio of the lowest speed side.

3. The control system for a drive unit of a hybrid vehicle as claimed in claim 2, wherein:
    the transmission comprises a unidirectional engagement device which is engaged when setting the speed change ratio of the lowest side under driving state, and a bidirectional engagement device which is arranged in parallel with the unidirectional engagement device.

4. The control system for a drive unit of a hybrid vehicle as claimed claim 1, further comprising:
    a plurality of oil pumps; and
    a pump driving means for driving the oil pumps in case of driving the vehicle by the electric motor.

5. The control system for a drive unit of a hybrid vehicle as claimed in claim 4, wherein:
    the plurality of oil pumps include a mechanical oil pump driven by the another power unit and an electrical oil pump; and
    the pump driving means includes a means for driving the another power unit, the mechanical oil pump, and the electrical oil pump by driving the electric motor.

6. The control system for a drive unit of a hybrid vehicle as claimed in claim 1:
wherein the electric motor includes a motor generator which is rotated by a power inputted through the transmission to generate electric power; and
further comprising:
an electric storage device connected with the motor generator;
a detecting means for detecting a state of charge of the electric storage device; and
an upshift commanding means for carrying out an upshifting of the transmission in case the detecting means detects that the state of charge of the electric storage device declines.

7. The control system for a drive unit of a hybrid vehicle as claimed in claim 1, further comprising:
a differential gear mechanism to which the another power unit is connected, and which carries out a speed change of power outputted from the another power unit and outputs the changed power.

8. The control system for a drive unit of a hybrid vehicle as claimed in claim 7, wherein:
the transmission and the differential gear mechanism are connected in tandem.

9. The control system for a drive unit of a hybrid vehicle as claimed in claim 7, wherein:
the speed change ratio of the drive unit is set by both of the transmission and the differential gear mechanism.

10. The control system for a drive unit of a hybrid vehicle as claimed in claim 1: further comprising a differential gear mechanism including an input rotary element, an output rotary element and a reaction rotary element; and
wherein the another power unit is connected with the input rotary element, an input member of the transmission and the electric motor are connected with the output rotary element, and the motor generator having a generating function is connected with the reaction rotary element.

11. The control system for a drive unit of a hybrid vehicle as claimed in claim 10, wherein:
the differential gear mechanism is constructed of a planetary gear mechanism comprising a carrier functioning as the input rotary element, a sun gear functioning as the reaction rotary element, and a ring gear functioning as the output rotary element; and
the ring gear is connected with an input shaft of the transmission.

12. The control system for a drive unit of a hybrid vehicle as claimed in claim 1, wherein:
the transmission is constructed of two sets of planetary gear mechanisms.

13. The control system for a drive unit of a hybrid vehicle as claimed in claim 12, wherein:
the planetary gear mechanism includes a first single pinion type planetary gear mechanism, and a second single pinion type planetary gear mechanism.

14. The control system for a drive unit of a hybrid vehicle as claimed in claim 13, wherein:
a first sun gear of the first single pinion type planetary gear mechanism and a second sun gear of the second single pinion type planetary gear mechanism are connected with each other, a first carrier of the first single pinion type planetary gear mechanism and a second ring gear of the second single pinion type planetary gear mechanism are connected with each other, and the first carrier and the second ring gear are connected with the output member.

15. The control system for a drive unit of a hybrid vehicle as claimed in claim 14, further comprising:
a first clutch mechanism connecting a first ring gear of the first single pinion type planetary gear mechanism with the output rotary element of the differential gear mechanism selectively;
a second clutch mechanism connecting the first and the second sun gears connected with each other with the output element of the differential gear mechanism selectively;
a first brake mechanism connecting the first and the second sun gears connected with each other with the output element of the differential gear mechanism selectively; and
a second brake mechanism fixing a second carrier of the second single pinion type planetary gear mechanism selectively.

16. The control system for a drive unit of a hybrid vehicle as claimed in claim 15, wherein:
the second brake mechanism includes the unidirectional engagement device fixing a rotation in one direction, and the bidirectional engagement device arranged in parallel with the unidirectional engagement device.

17. A control system for a drive unit of a hybrid vehicle including an electric motor, another power unit other than the electric motor, and a transmission, comprising:
a speed change restricting means for restricting a speed change operation of the transmission in case a vehicle is run by a power of the electric motor;
a speed change ratio maintaining means for maintaining a current speed change ratio of the transmission when a running mode of the vehicle is switched from a normal running in which the power is outputted from the another power unit, to a motor running in which the vehicle is run by the power of the electric motor; and
a speed change ratio fixing means for setting the speed change ratio of the transmission to the lowest speed side and fixing thereto, in case an output changing demand is outputted after the speed change ratio of the transmission is maintained.

18. The control system for a drive unit of a hybrid vehicle as claimed in claim 17, wherein:
the speed change restricting means includes a means for fixing a speed change ratio of the transmission to a speed change ratio of the lowest speed side.

19. The control system for a drive unit of a hybrid vehicle as claimed in claim 18, wherein:
the transmission comprises a unidirectional engagement device which is engaged when setting the speed change ratio of the lowest side under driving state, and a bidirectional engagement device which is arranged in parallel with the unidirectional engagement device.

20. The control system for a drive unit of a hybrid vehicle as claimed in claim 17, further comprising:
a plurality of oil pumps; and
a pump driving means for driving the oil pumps in case of driving the vehicle by the electric motor.

21. The control system for a drive unit of a hybrid vehicle as claimed in claim 20, wherein:
the plurality of oil pumps include a mechanical oil pump driven by the another power unit and an electrical oil pump; and
the pump driving means includes a means for driving the another power unit, the mechanical oil pump, and the electrical oil pump by driving the electric motor.

22. The control system for a drive unit of a hybrid vehicle as claimed in claim 17:

wherein the electric motor includes a motor generator which is rotated by a power inputted through the transmission to generate electric power; and further comprising:

an electric storage device connected with the motor generator;

a detecting means for detecting a state of charge of the electric storage device; and an upshift commanding means for carrying out an upshifting of the transmission in case the detecting means detects that the state of charge of the electric storage device declines.

23. The control system for a drive unit of a hybrid vehicle as claimed in claim 17, further comprising:

a differential gear mechanism to which the another power unit is connected, and which carries out a speed change of power outputted from the another power unit and outputs the changed power.

24. The control system for a drive unit of a hybrid vehicle as claimed in claim 23, wherein:

the transmission and the differential gear mechanism are connected in tandem.

25. The control system for a drive unit of a hybrid vehicle as claimed in claim 23, wherein:

the speed change ratio of the drive unit is set by both of the transmission and the differential gear mechanism.

26. The control system for a drive unit of a hybrid vehicle as claimed in claim 17: further comprising a differential gear mechanism including an input rotary element, an output rotary element and a reaction rotary element; and wherein the another power unit is connected with the input rotary element, an input member of the transmission and the electric motor are connected with the output rotary element, and the motor generator having a generating function is connected with the reaction rotary element.

27. The control system for a drive unit of a hybrid vehicle as claimed in claim 26, wherein:

the differential gear mechanism is constructed of a planetary gear mechanism comprising a carrier functioning as the input rotary element, a sun gear functioning as the reaction rotary element, and a ring gear functioning as the output rotary element; and the ring gear is connected with an input shaft of the transmission.

28. The control system for a drive unit of a hybrid vehicle as claimed in claim 17, wherein:

the transmission is constructed of two sets of planetary gear mechanisms.

29. The control system for a drive unit of a hybrid vehicle as claimed in claim 28, wherein:

the planetary gear mechanism includes a first single pinion type planetary gear mechanism, and a second single pinion type planetary gear mechanism.

30. The control system for a drive unit of a hybrid vehicle as claimed in claim 29, wherein:

a first sun gear of the first single pinion type planetary gear mechanism and a second sun gear of the second single pinion type planetary gear mechanism are connected with each other, a first carrier of the first single pinion type planetary gear mechanism and a second ring gear of the second single pinion type planetary gear mechanism are connected with each other, and the first carrier and the second ring gear are connected with the output member.

31. The control system for a drive unit of a hybrid vehicle as claimed in claim 30, further comprising:

a first clutch mechanism connecting a first ring gear of the first single pinion type planetary gear mechanism with the output rotary element of the differential gear mechanism selectively;

a second clutch mechanism connecting the first and the second sun gears connected with each other with the output element of the differential gear mechanism selectively;

a first brake mechanism connecting the first and the second sun gears connected with each other with the output element of the differential gear mechanism selectively; and a second brake mechanism fixing a second carrier of the second single pinion type planetary gear mechanism selectively.

32. The control system for a drive unit of a hybrid vehicle as claimed in claim 31, wherein:

the second brake mechanism includes the unidirectional engagement device fixing a rotation in one direction, and the bidirectional engagement device arranged in parallel with the unidirectional engagement device.

33. A control method for a drive unit of a hybrid vehicle including an electric motor, another power unit other than the electric motor, and a transmission, comprising:

a speed change inhibiting of inhibiting a speed change operation of the transmission in case a vehicle is run by a power of the electric motor; a speed change ratio maintaining of maintaining a current speed change ratio of the transmission when a running mode of the vehicle is switched from a normal running in which the power is outputted from the another power unit, to a motor running in which the vehicle is run by the power of the electric motor; and a speed change ratio fixing of setting the speed change ratio of the transmission to the speed change ratio of the lowest speed side and fixing the speed change ratio thereto, in case an output changing demand is outputted after the speed change ratio of the transmission is maintained.

34. The control method for a drive unit of a hybrid vehicle, as claimed in claim 33, wherein:

the speed change inhibiting includes fixing a speed change ratio of the transmission to a speed change ratio of the lowest speed side.

35. The control method for a drive unit of a hybrid vehicle, as claimed in claim 33, wherein:

the vehicle includes a plurality of oil pumps; and further comprising a pump driving of driving the oil pumps in case of driving the vehicle by the electric motor.

36. The control method for a drive unit of a hybrid vehicle, as claimed in claim 35, wherein:

the plurality of oil pumps include a mechanical oil pump driven by the another power unit and an electrical oil pump; and the pump driving includes driving the another power unit and the mechanical oil pump by driving the electric motor, and driving the electrical oil pump.

37. The control method for a drive unit of a hybrid vehicle, as claimed in claim 33:

wherein the electric motor includes a motor generator which is rotated by a power inputted through the transmission to generate electric power and an electric storage device connected with the motor generator; and further comprising:

a detecting of detecting a state of charge of the electric storage device; and an upshift commanding of carrying out an upshifting of the transmission in case a decline of the state of charge of the electric storage device is detected at the detecting.

38. A control method for a drive unit of a hybrid vehicle including an electric motor, another power unit other than the electric motor, and a transmission, comprising:

a speed change restricting of restricting a speed change operation of the transmission in case a vehicle is run by a power of the electric motor; a speed change ratio maintaining of maintaining a current speed change ratio of the transmission when a running mode of the vehicle is switched from a normal running in which the power is outputted from the another power unit, to a motor running in which the vehicle is run by the power of the electric motor; and a speed change ratio fixing of setting the speed change ratio of the transmission to the speed change ratio of the lowest speed side and fixing the speed change ratio thereto, in case an output changing demand is outputted after the speed change ratio of the transmission is maintained.

39. The control method for a drive unit of a hybrid vehicle, as claimed in claim 38, wherein:

the speed change restricting includes fixing a speed change ratio of the transmission to a speed change ratio of the lowest speed side.

40. The control method for a drive unit of a hybrid vehicle, as claimed in claim 38, wherein:

the vehicle includes a plurality of oil pumps; and further comprising a pump driving of driving the oil pumps in case of driving the vehicle by the electric motor.

41. The control method for a drive unit of a hybrid vehicle, as claimed in claim 40, wherein:

the plurality of oil pumps include a mechanical oil pump driven by the another power unit and an electrical oil pump; and the pump driving includes driving the another power unit and the mechanical oil pump by driving the electric motor, and driving the electrical oil pump.

42. The control method for a drive unit of a hybrid vehicle, as claimed in claim 38:

wherein the electric motor includes a motor generator which is rotated by a power inputted through the transmission to generate electric power and an electric storage device connected with the motor generator; and further comprising:

a detecting of detecting a state of charge of the electric storage device; and an upshift commanding of carrying out an upshifting of the transmission in case a decline of the state of charge of the electric storage device is detected at the detecting.

43. A control system for a drive unit of a hybrid vehicle including an electric motor, another power unit other than the electric motor, and a transmission, comprising:

a speed change inhibiting device which inhibits a speed change operation of the transmission in case a vehicle is run by a power of the electric motor;

a speed change ratio maintaining device which maintains a current speed change ratio of the transmission when a running mode of the vehicle is switched from a normal running in which the power is outputted from the another power unit, to a motor running in which the vehicle is run by the power of the electric motor; and a speed change ratio fixing device which sets the speed change ratio of the transmission to the speed change ratio of the lowest speed side and fixes the speed change ratio thereto, in case an output changing demand is outputted after the speed change ratio of the transmission is maintained.

44. A control system for a drive unit of a hybrid vehicle including an electric motor, another power unit other than the electric motor, and a transmission, comprising:

a speed change restricting device which restricts a speed change operation of the transmission in case a vehicle is run by a power of the electric motor;

a speed change ratio maintaining device which maintains a current speed change ratio of the transmission when a running mode of the vehicle is switched from a normal running in which the power is outputted from the another power unit, to a motor running in which the vehicle is run by the power of the electric motor; and a speed change ratio fixing device which sets the speed change ratio of the transmission to the speed change ratio of the lowest speed side and fixes the speed change ratio thereto, in case an output changing demand is outputted after the speed change ratio of the transmission is maintained.

* * * * *